United States Patent [19]
Thompson et al.

[11] Patent Number: 5,930,514
[45] Date of Patent: Jul. 27, 1999

[54] SELF-DELETION FACILITY FOR APPLICATION PROGRAMS

[75] Inventors: Suzanne Marie Thompson; Joseph Armand Caloumenos, both of Lexington, Ky.

[73] Assignee: International Business Machines Corporation, Armonk, N.Y.

[21] Appl. No.: 08/663,325

[22] Filed: May 23, 1996

Related U.S. Application Data

[63] Continuation of application No. 08/284,022, Aug. 1, 1994, abandoned.

[51] Int. Cl.$^6$ .............................. G06F 17/30; G06F 9/455
[52] U.S. Cl. ............................................ 395/712; 707/206
[58] Field of Search ................................... 707/205, 206; 395/712

[56] References Cited

U.S. PATENT DOCUMENTS

| | | | |
|---|---|---|---|
| 3,670,310 | 6/1972 | Bharwani et al. | 707/3 |
| 5,185,885 | 2/1993 | Dysart et al. | 707/100 |
| 5,287,447 | 2/1994 | Miller et al. | 345/342 |
| 5,355,497 | 10/1994 | Cohen-Levy | 707/200 |
| 5,367,671 | 11/1994 | Feigenbaum et al. | 707/1 |
| 5,473,772 | 12/1995 | Halliwell et al. | 395/712 |
| 5,602,993 | 2/1997 | Stromberg | 395/712 |
| 5,768,566 | 6/1998 | Harikrishnan et al. | 395/500 |

OTHER PUBLICATIONS

Nelson; Give Windows a Kick In the Pants; Home Office Computing; Jul., 1993; vol. 11, Issue 7, p. 32.
Uninstaller; Byte; Nov., 1993; vol. 18, Issue 12, p. 202.
The Dangerous Art: Uninstalling Windows Apps—Safely; PC–Computing, v6, n11, p. 280, Nov. 1993.
Brian Livingston; "Ripping Windows Apps Out by the Roots"; Windows Magazine, pp. 197–200, May 1993.
Brian Livingston; "Controversy Heats Up as MicroHelp Claims It Owns 'Uninstall'"; Infoworld, v16, n33, p. 26, Aug. 1994.

*Primary Examiner*—Parshotam S. Lall
*Assistant Examiner*—Kenneth R. Coulter
*Attorney, Agent, or Firm*—Kudirka & Jobse, LLP

[57] ABSTRACT

A facility for permitting self-deletion of application programs from a computer's mass-storage device is disclosed. The facility includes a component that tracks new files added in the course of program installation, as well as any modifications to permanent (e.g., system) files. An associated deletion component, actuable by a user, removes the added files from mass storage and reverses changes made to the permanent files. In one embodiment, the two components of the invention are associated with individual application programs; in another embodiment, the components are permanent features of the operating system or graphical user interface, and the tracking component maintains separate information for all application programs as these are installed.

21 Claims, 1 Drawing Sheet

SELF-DELETION FACILITY FOR APPLICATION PROGRAMS

RELATED APPLICATIONS

This application is a continuation of application Ser. No. 284,022 filed Aug. 1, 1994, now abandoned.

BACKGROUND OF THE INVENTION

Field of the Invention

The present invention relates to operation of interactive computer programs, and more particularly to a facility for deleting such programs when no longer useful.

SUMMARY OF THE INVENTION

Description of the Related Art

As the market for computers has expanded beyond technically sophisticated users and reached individuals with varying degrees of data-processing expertise, ready-to-use application programs (such as word processors, spreadsheets, and design software) have proliferated dramatically. Such programs are easily loaded and generally run on a wide variety of computer systems (usually inexpensive personal computers). A typical application consists of at least one program file (in DOS systems, these are usually named with an .EXE or .COM extension) that contains executable processor instructions which direct operation of the application, and possibly other types of files as well. For example, an application may produce intricate screen displays that are stored as bitmap (e.g., .BMP extension) files; may include unformatted text (e.g., .TXT extension) files that provide the user with information too recent to have been printed in the documentation supplied with the program; may include program-information (e.g., .PIF extension) files for compatibility with a graphical user interface; may generate data files; and may be provided with demonstration or tutorial files that help the user attain proficiency using the application.

Files retained on mass-storage devices such as hard disks are ordinarily grouped into hierarchical "directories" or "folders". These partitions, created and managed by the computer's operating system, organize files belonging to different applications or having different purposes; in this way, related files may be listed and examined separate from unrelated files, and the chances of inadvertent file removal are lessened. For user convenience, application programs generally include an installation facility that creates or locates appropriate directories and copies the constituent files thereto; the user is not required to set up the directory structure, nor need s/he even be aware of it to use the installed program. Some applications arrange files in a single directory or multiple directories dedicated exclusively to that application. Others utilize directories shared with other programs, or distribute files among some shared and some exclusive directories. The program may also require changes to system files (e.g., CONFIG.SYS or WIN.INI).

The constituent files of application programs can occupy considerable disk storage space. Therefore, when the user replaces or no longer desires a particular program, it is highly advantageous to delete the program files in order to free disk space for other files. Unfortunately, the very features of application programs that render them easily employed by unsophisticated users also operate to hamper their convenient removal. Freeing the maximum amount of disk space requires deletion of every program file; restoration of any modified system files to their original states is usually also advisable. Because the file structure ordinarily remains invisible to the user, however, s/he may remain unaware of the identities of the program files and their directory locations, or the nature of any changes to the system files. Moreover, even with knowledge of the program file structure, deletion of the files ordinarily requires individual manual operations (for example, by commands issued directly to the operating system or through use of a file-management facility).

DESCRIPTION OF THE INVENTION

Advantages of the Invention

In light of the foregoing, the present invention offers the advantage of facilitating convenient deletion of all files associated with an application program.

Another advantage offered by the invention is the ability of a user to delete an application program in a single step.

Still another advantage offered by the invention is convenient restoration of system files to their states prior to installation of the application program.

Other advantages will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

Brief Summary of the Invention

In accordance with the invention, a facility is provided for tracking new files added in the course of program installation, as well as any modifications to permanent (e.g., system) files. An associated deletion facility, actuable by a user, removes the added files from mass storage and reverses changes made to the permanent files. In one embodiment, the two components of the invention are associated with individual application programs; in another embodiment, the components are permanent features of the operating system or graphical user interface, and the tracking component maintains separate information for all application programs as these are installed.

BRIEF DESCRIPTION OF THE DRAWINGS

The foregoing discussion will be understood more readily from the following detailed description of the invention, when taken in conjunction with the single FIGURE of the drawing, which illustrates a block diagram of a computer system embodying the present invention.

DESCRIPTION OF THE PREFERRED EMBODIMENT(S)

Figure 1:
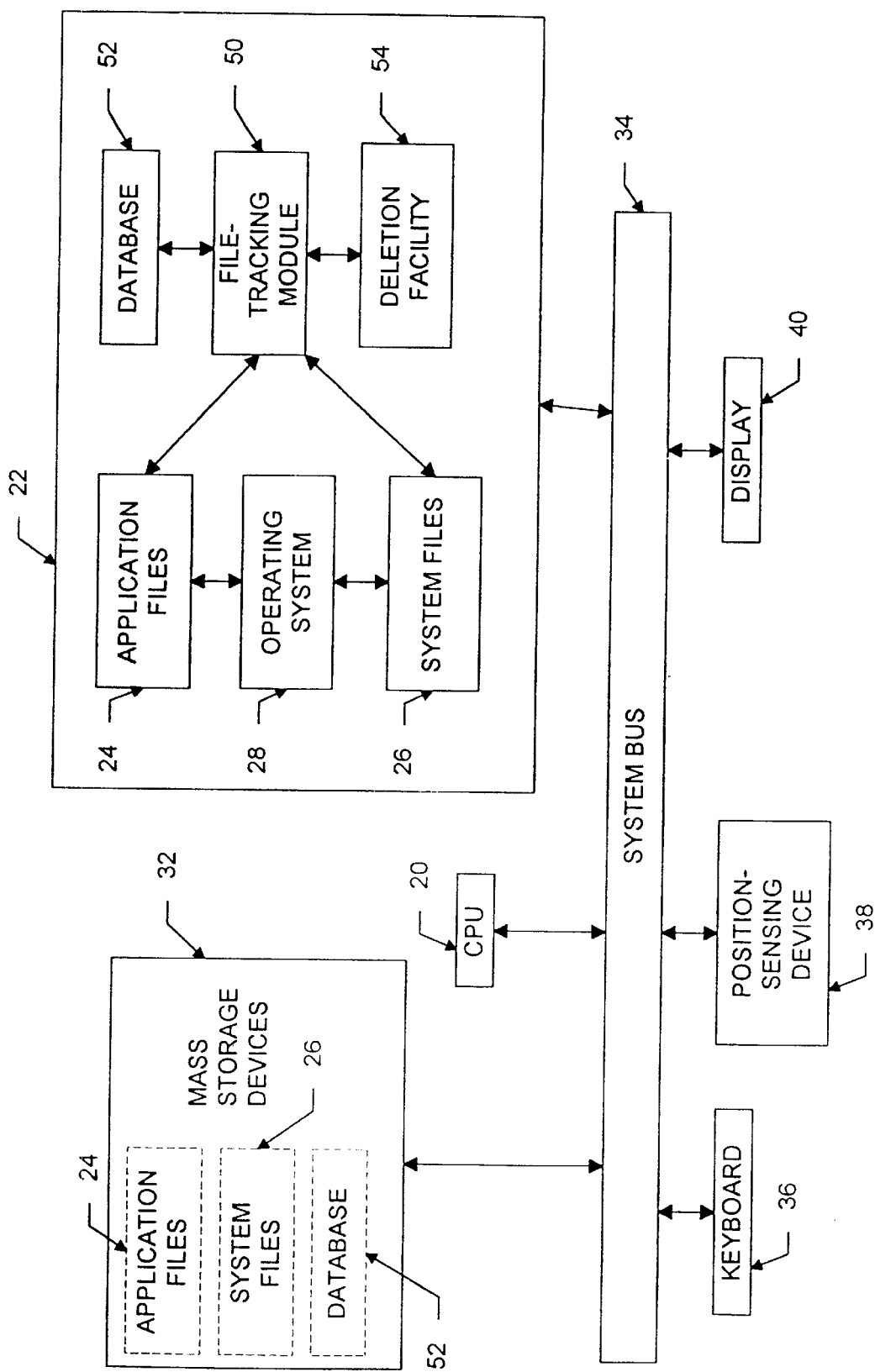

Refer to FIG. 1, which illustrates a representative implementation of the present invention. The depicted computer system includes a central-processing unit (CPU) 20, which performs operations on and interacts with a main system memory 22 and components thereof (described in greater detail below). System memory 22 typically includes volatile or random-access memory (RAM) for temporary storage of information, including the files 24 necessary to implement an application program; system files 26, which enable CPU 20 to control basic hardware functions (such as interpreting keyboard signals and controlling a printer); and portions of the operating system 28. System 22 typically also includes read-only memory (ROM) for permanent storage of the computer's configuration and basic operating commands, such as additional portions of operating system 28. The system further includes at least one mass storage device 32 (e.g., a hard disk), which contains permanent files of information, including application-program files. All components of the system communicate over a bidirectional system bus 34.

The user interacts with the system using a keyboard 36 and a position-sensing device (e.g., a mouse) 38. The output of either device can be used to designate information or select particular areas of a screen display 40 corresponding to functions to be performed by the system. In current systems, interactions between a user and an application program are typically managed through a graphical user interface (GUI) appearing on display 40. The GUI typically resembles the surface of an electronic "desktop," and an application program running on the computer is represented as one or more "windows," i.e., rectangular regions of the screen. The application program presents information to the user through its window by drawing images, graphics or text within the rectangular region, while the user communicates with the application by "pointing at" standard graphical objects in the window with position-sensing device 38 or by typing information into keyboard 36.

The application programs themselves consist of a series of files 24, originally resident on mass-storage device 32 and brought into system memory 22 when the user activates the application. On a GUI, activation is accomplished by using position-sensing device 38 to move the cursor onto or near a graphical identifier, or "icon," representing the program, and pressing and quickly releasing (i.e., "clicking") a button on position-sensing device 38. Application files 24 include program files which, in cooperation with operating system 28, direct operation of the application program. More specifically, application programs make use of operating-system functions by issuing task commands to operating system 28, which then performs the requested task.

Applications are typically organized on a GUI into pre-defined "groups" of programs and related program files, each represented by an individual icon; the GUI arranges these on the screen and, upon their activation by a user, runs the applications they represent. The user can arrange, create and delete the application icons and icon groups displayed on the GUI. However, deletion of an icon ordinarily does not result in elimination of the underlying program files. These files, as noted previously, can include a variety of execution and data files, which may be located on unrelated directories in mass-storage devices 32.

The invention permits a user to eliminate application files 24 and restore system files 26 to the state in which they existed prior to installation of the unwanted application. A file-tracking module 50 creates and maintains database 52, stored on a mass-storage device 32, that specifies files associated with an application. Specifically, database 52 contains the names and resident directories of all files added to mass-storage devices 32 in the course of installing an application program, as well as all permanent files (primarily system files) modified during installation. Deletion facility 54, when activated, issues instructions to operating system 28 to erase the program and data files associated exclusively with the application program, and reverses changes made to any permanent files. In DOS systems, erasure is typically accomplished by designating files as inactive, thereby freeing the disk space they occupy.

In one embodiment, file-tracking module 50 stores duplicate system files 26 on a mass-storage device 32 under dummy file names prior to activation of the installation routines that modify these files. Deletion facility 54, when activated, erases the operative system files and renames the duplicate files after the erased files. The renamed system files then operate as did the original, unmodified files. In another embodiment, file-tracking module 50 maintains, in database 52, the line-by-line code changes made to the system files. When deletion facility 54 is activated, it replaces the modified system-file code with the unmodified code stored in database 52, thereby restoring system files 26 to their previous state. Obviously, the latter approach requires less system memory to implement, which can prove advantageous for computers having large system files; in addition, it provides greater flexibility, since the system files may have been modified since installation of the unwanted program to accommodate other applications. Replacing only the changes made during installation of the unwanted program preserves all subsequent changes.

Deletion facility 54 includes or specifies a graphical file whose contents represent a deletion icon, which the GUI places on the screen along with the program icons of an application. Clicking the deletion icon activates deletion facility 54 (preferably after the appearance of a standard warning box that reminds the user of the consequences of program deletion, requiring the user to click in acknowledgment before deletion proceeds). Preferably, file-tracking module 50 and deletion facility 54 are associated with the individual application programs to which they relate. When programs is deleted, deletion facility 54 removes the deletion icon (by erasing the icon file and issuing appropriate commands to the GUI) and itself (by directing erasure of its own execution file along with the program files) from the system. With this configuration, it is sometimes possible to omit storage of individual filename entries in database 52. For example, an application-specific file-tracking module 50 can be configured to recognize a characteristic, predetermined identification pattern to which all program files conform, and to look for program files only in one or more designated directories. In the simplest case, all program files are stored exclusively in a single directory uniquely created during installation; operating system 28 can then be instructed simply to delete the entire application-specific directory and its constituent files.

Alternatively, file-tracking module 50 and deletion facility 54 can be permanent features of operating system 28 or the GUI, augmenting database 52 each time a new application is added, and creating and displaying individual deletion icons for each application program. Activation of the deletion icon associated with a particular application program results in removal of only those files exclusively associated with the program, and reversal only of changes specific to that program which were made to the permanent files.

It will therefore be seen that the foregoing represents a convenient and highly efficient approach to removal of unwanted program files from permanent storage. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A data processing system that facilitates on-demand deletion of an application program, wherein said application program includes processor instructions and data, said data processing system comprising:

a. a processor unit for executing said processor instructions;
b. a storage device coupled to said processor unit and having stored thereon a plurality of discrete storage files holding said application processor instructions and said application data;
c. a file-tracking module coupled to said processor unit and said storage device and containing a first reference to each of said plurality of discrete storage files associated with the application program and a second reference to each of said plurality of discrete storage files which are associated exclusively with said application program; and
d. a deletion facility coupled to said file-tracking module for causing removal from said storage device of predetermined ones of said plurality of discrete storage files, said predetermined ones of said plurality of discrete storage files include at least discrete storage files specified by said second references;
   at least one of said plurality of discrete storage files associated with said application program is stored in a directory containing only discrete storage files associated with said application program; and
   said deletion facility includes means for eliminating said one directory.

2. The system of claim 1 wherein said deletion facility includes means for freeing storage space occupied by said predetermined ones of said plurality of discrete storage files on said storage device by designating as inactive said predetermined ones of said plurality of discrete storage files.

3. The system of claim 1 wherein said plurality of discrete storage files stored on said storage device are organized into directories, and wherein said system further comprises a database stored on said storage device, said database including an identifier and a directory location of each of said plurality of discrete storage files.

4. The system of claim 1 wherein said plurality of discrete storage files associated with said application program have names conforming to a predetermined identification pattern.

5. The system of claim 1 further comprising a graphical user interface having an icon generator for generating on said graphical user interface a user-actuable deletion icon designating said application program, wherein in response to a user actuating said deletion icon, said deletion facility causes removal from said storage device of predetermined ones of said plurality of discrete storage files of said application program.

6. The system of claim 1 wherein:
   at least one of said plurality of discrete storage files is a permanent file that has been modified to cooperate with said application program;
   said file-tracking module identifies modifications to said permanent file; and
   said deletion facility, when actuated, reverses said modifications to each permanent file which has been modified to cooperate with said application program.

7. The system of claim 1 wherein:
   at least one of said plurality of discrete storage files is a permanent file that has been modified to cooperate with said application program;
   said file-tracking module identifies unmodified versions of each of said permanent files that has been modified; and
   said deletion facility, when actuated, replaces each permanent file which has been modified with a version of said permanent file identified by said file-tracking module as an unmodified version of said permanent file.

8. The system of claim 1 wherein said deletion facility includes means for clearing said predetermined ones of said plurality of discrete storage file on said storage device.

9. A method of configuring an application program for user-actuable self-deletion, said application program having processor instructions and data which are stored on a storage device as a plurality of discrete storage files, said method comprising the steps of:
   a. specifying said plurality of discrete storage files associated with the application program;
   b. specifying first ones of said plurality of discrete storage files associated exclusively with said application program; and
   c. upon a single user command, deleting from said storage device predetermined ones of said plurality of discrete storage files, said predetermined ones of said plurality of discrete storage files includes at least said discrete storage files specified as being associated exclusively with said application program;
      at least one of said plurality of discrete storage files associated with said application program is stored within one directory containing only files associated with said application program and said deletion step comprises the step of eliminating said at least one directory.

10. The method of claim 9 wherein said deleting step includes the step of freeing storage space occupied by said predetermined ones of said plurality of discrete storage files on said storage device by designating as inactive said predetermined ones of said plurality of discrete storage files.

11. The method of claim 9 wherein
   the files on the mass-storage device are organized into directories; and
   the files are specified on a database stored on the mass-storage device;
   and further comprising the step of:
   d. introducing into the database identifiers and directory locations of the specified files.

12. The method of claim 9 wherein said deleting step comprises the step of deleting files having names conforming to a predetermined identification pattern.

13. The method of claim 9 further comprising the step of generating, on a display, a user-actuable deletion icon for causing said deleting step to be carried out.

14. The method of claim 9 wherein at least some of the specified files are permanent files that have been modified to accommodate the application program, and further comprising the steps of:
   d. storing the modifications; and
   e. reversing the modifications to the permanent files.

15. The method of claim 9 wherein at least some of the specified files are permanent files that have been modified to accommodate the application program, and further comprising the steps of:
   d. storing unmodified versions of the permanent files; and
   e. replacing the modified permanent files with the unmodified versions.

16. The method of claim 9 wherein said deleting step includes the step of clearing the predetermined ones of said plurality of discrete storage files from said storage device.

17. A computer program product for use with a storage device, said computer program product comprising:
   a computer readable medium having computer useable program code means embodied in said medium for facilitating on-demand deletion of an application program stored on a storage device as a plurality of discrete storage files in response to a user request, said computer program product including:

first program code means for causing a first reference to each of said plurality of discrete storage files to be stored in said storage device;

second program code means for causing a second reference to each of the plurality of discrete storage files which are associated exclusively with said application program to be stored in said storage device; and third program code means responsive to said user request for causing removal from said storage device of predetermined ones of said plurality of discrete storage files of said application program, at least one of said predetermined ones of said plurality of discrete storage files stored in a directory on the storage device and identified by one of said stored second references; and fourth program code means for eliminating said directory.

18. The computer program product of claim 17 wherein:

said first causing means includes means for identifying modifications to at least one of said plurality of discrete storage files which is a permanent file that has been modified to cooperate with said application program; and said third causing means includes means for reversing said modifications to each permanent file which has been modified to cooperate with said application program.

19. The computer program product of claim 17 wherein:

said first means includes means for identifying unmodified versions of at least one discrete storage file which is a permanent file that has been modified to cooperate with said application program; and said third means includes means for replacing each permanent file which has been modified with a version of said permanent file identified by said first means as an unmodified version of said permanent file.

20. A method for processing an application program in a computer system having a system memory and a storage device, the method comprising the steps of:

installing the application program on the computer system, the application program including a plurality of files, each of the plurality of files having a file name;

storing the plurality of files included in the application program on the storage device as a plurality of discrete storage files;

generating a database;

storing in the database the file names of each of the plurality of files included in the application program and stored on the storage device;

storing in the database a file name of each permanent file stored on the storage device and modified during installation of the application program;

identifying each of the files stored in the database which are associated exclusively with the application program; and upon a user command, deleting from said storage device predetermined ones of said plurality of discrete storage files, said predetermined ones of said plurality of discrete storage files includes at least said discrete storage files specified as being associated exclusively with said application program; at least one of said plurality of discrete storage files associated with said application program is stored within one directory containing only files associated with said application program and said deletion step comprises the step of eliminating said at least one directory.

21. The method of claim 20 further comprising the step of, in response to a user delete command, erasing each of the plurality of files identified in said identifying step as being associated exclusively with the application program.

* * * * *